(12) United States Patent
Malone et al.

(10) Patent No.: US 7,203,419 B2
(45) Date of Patent: Apr. 10, 2007

(54) HEATED CONDUIT

(75) Inventors: Neil Malone, Stockport (GB); Jason Daniel Harold O'Connor, Glossop (GB)

(73) Assignee: Heatsafe Cable Systems, Ltd, Stockport, Cheshire (GB)

( * ) Notice: Subject to any disclaimer, the term of this patent is extended or adjusted under 35 U.S.C. 154(b) by 0 days.

(21) Appl. No.: 10/525,106

(22) PCT Filed: Aug. 1, 2003

(86) PCT No.: PCT/GB03/03350

§ 371 (c)(1),
(2), (4) Date: Feb. 18, 2005

(87) PCT Pub. No.: WO2004/018924

PCT Pub. Date: Mar. 4, 2004

(65) Prior Publication Data
US 2005/0274713 A1    Dec. 15, 2005

(30) Foreign Application Priority Data
Aug. 20, 2002    (GB) ................................. 0219373.8

(51) Int. Cl.
*E03B 7/10* (2006.01)

(52) U.S. Cl. ........................ 392/468; 392/469; 392/479
(58) Field of Classification Search ..................... None
See application file for complete search history.

(56) References Cited

U.S. PATENT DOCUMENTS

| 3,378,673 | A | * | 4/1968 | Hopper ........................ 392/472 |
| 4,547,659 | A | * | 10/1985 | Leary et al. ................. 219/544 |
| 5,294,780 | A | * | 3/1994 | Montierth et al. .......... 219/535 |
| 2002/0007861 | A1 | | 1/2002 | Hansen et al. |

FOREIGN PATENT DOCUMENTS

DE    100 51 111 A    4/2002

OTHER PUBLICATIONS

PCT International Search Report for International Application No. PCT/GB03/03350 dated Oct. 16, 2003 (7 p.).

* cited by examiner

*Primary Examiner*—Thor Campbell
(74) *Attorney, Agent, or Firm*—Conley Rose, PC

(57) ABSTRACT

A conduit comprising a pipe, an electrical heater extending along the length of the pipe, and a thermally insulating jacket extending around the pipe and heater. The pipe comprises a plastic inner tube. The plastic inner tube is received within a deformable metal tube such that the plastics inner tube and deformable metal tube form a composite double-walled structure.

33 Claims, 3 Drawing Sheets

HEATED CONDUIT

Figure 1:
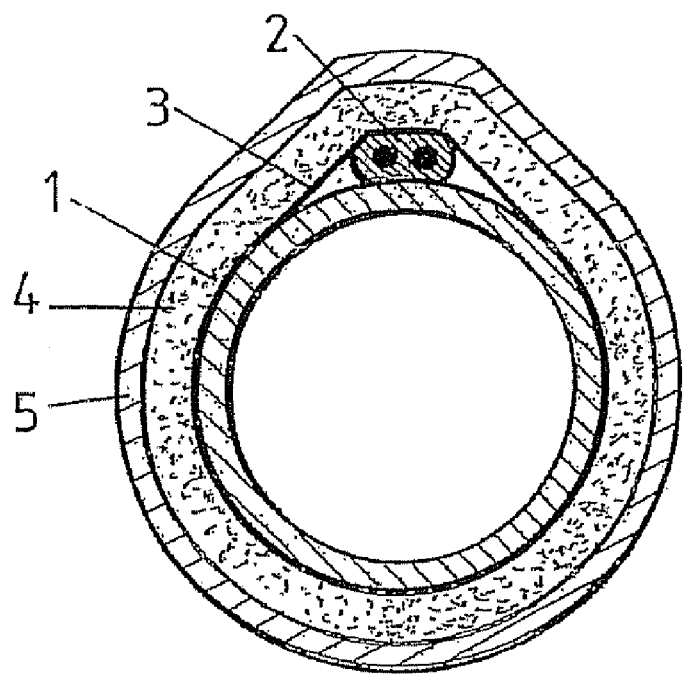

The present invention relates to a conduit comprising a pipe, an electrical heater extending along the length of the pipe, and a thermally insulating jacket extending around the pipe and heater.

Coilable conduits incorporating heating cables and insulating jackets are known. In a typical such conduit, a pipe is formed from a metal such as copper or stainless steel. A cable is run along the length of the pipe and secured in position on the pipe by a strapping film helically wound around the pipe and cable assembly. An insulating jacket is then formed over that assembly by wrapping a glass fibre tape over the pipe and cable. The insulated assembly may then in turn be covered with a sheath of for example polyethylene.

The known coilable conduit incorporating heating cables is generally used for frost protection in industrial applications. The known conduit is relatively expensive, for example of the order of £30 per metre. In addition it is not easy to work with as coiling and uncoiling of the conduit is difficult if kinking is to be avoided. The making of connections both with regard to fluids and electrical power supplies requires skilled operators. It is also the case that the cable is not of circular outer cross section because the radial thickness of the cable adds to the overall size of the assembly on the side of the assembly at which the cable is located. This makes coiling on a roll difficult. Furthermore voids are formed between the pipe and the foil used to hold the cable on the pipe on either side of the cable and the existence of such voids is generally understood to be undesirable.

Pipes fabricated from plastics material, for example cross-linked polyethylene, are well known. Such pipes have certain advantages, notably suitability for use with easy-to-use push-fit couplings. Plastic pipes have not been considered ideal in the past however for applications in which heating is required because the material from which the plastics pipe is fabricated is resistant to the conduction of thermal energy through the pipe wall to whatever fluid is carried by the pipe.

Composite pipes are known which comprise a three-layer wall structure, that is an inner plastics tube formed of for example cross linked polyethylene, an intermediate metal tube formed of for example aluminium, and a plastics outer tube formed of for example cross-linked polyethylene. The aluminium tube has been incorporated in such pipe to increase the burst strength and in addition has the advantage that when the pipe is bent the pipe remains in the shape into which it is bent rather than springing back, as is the case where no metal tube is incorporated. The relatively thin aluminium tube is sufficient to provide improved burst strength and the presence of plastics layers on either side of the aluminium tube makes the composite structure relatively easy to bend without kinking. Such composite pipe is now available at relatively low prices and proposals have been made for its use in both potable water and central heating systems.

The possibility of heating hot water distribution systems in domestic applications has been previously considered. In a domestic application where there may be many metres of pipe between a source of hot water and a tap from which that water is dispensed, every time a user wishes to draw hot water the full length of the pipe is filled with hot water and the energy contained in the water left in;that pipe after the tap is closed is lost. Calculations have been made which indicate that if such pipes could be heated economically there would be a significant net saving in overall energy in many domestic situations. Unfortunately the provision of a heatable pipe suitable for such applications at an economically realistic price has not been considered practical and the mounting of heating cable and insulation in situ on previously installed pipework is not a practical proposition.

It is an object of the present invention to provide a heated conduit which addresses the problems discussed above.

According to the present invention, there is provided a conduit comprising a pipe, an electrical heater extending along the length of the pipe, and a thermally insulating jacket extending around the pipe and heater, wherein the pipe comprises a plastics inner tube, the plastics inner tube being received within a deformable metal tube such that the plastics inner tube and deformable metal tube form a composite double-walled structure.

The incorporation in the pipe of a metal tube makes it possible for heat generated outside the inner plastics tube to be distributed around the circumference of the pipe in a manner such that the inherent poor conductivity of the inner plastics tube does not prevent an adequate flow of energy to the contents of the pipe. Given the presence of the deformable metal tube the thickness of the inner plastics tube can be relatively small, further reducing the resistance to thermal transfer presented by the plastics inner tube.

Preferably, the pipe comprises the plastics inner tube, the metal tube, and an outer plastics tube, the metal tube being sandwiched between the inner and outer plastics tubes, and the heater being in contact with the outer plastics tube Such a three-walled composite structure is robust and resistant to kinking and, despite the presence of the plastics outer tube, thermal transfer into the tube from the heater can be sufficient in many applications.

The heater may be in the form of a cable incorporating longitudinally extending wires between which a heating element is electrically connected, the cable being mounted on the pipe. For example, the heating element can be in the form of a body of material having a positive temperature coefficient, the wires being embedded in the body of material. The cable may be in contact with at least one metal foil adhered to the pipe to further enhance the distribution of thermal energy from the heater to the pipe. The metal foil can be in the form of sheet which extends between the cable and the pipe, and/or a sheet which extends over the cable and onto the pipe on either side of the cable, and/or a metal foil which is wrapped around the cable.

The insulation may comprise first and second preformed layers mounted on the pipe, the first layer extending around the pipe from side surfaces of the cable and having a thickness substantially the same as the thickness of the cable measured from a lower surface of the cable in contact with the pipe, and the second layer extending over the first layer and an upper surface of the cable remote from the pipe. The result is a structure of substantially circular cross section. A circular cross section can also be achieved using a single preformed layer of insulation mounted on the pipe, the preformed layer being split longitudinally to define abutting edges which are stepped to accommodate the cable in a space formed between the abutting edges In an alternative arrangement, the heater may comprise a tube of material having a positive temperature coefficient supported on the pipe between two metal tubes. One of the tubes of electrically conductive material may be defined by the deformable metal tube which forms a composite structure with the plastics inner tube. The or each plastics tube may be formed from cross-linked polyethylene. The or each plastics tube may be formed from aluminium. The insulation jacket may be formed from one or more preformed tubes of foam. One advantage of the use of preformed tubes of foam is that differential expansion between the pipe and insulation is easily accommodated by relative movement therebetween. Similarly, foam insulation does not resist bending of the internal pipe. Preferably the internal pipe is formed of material such that it retains the shape into which it is bent.

It is to be understood that more than one electrical heater may be used and that the plastics tube may be, for example, polymeric.

Figure 2:
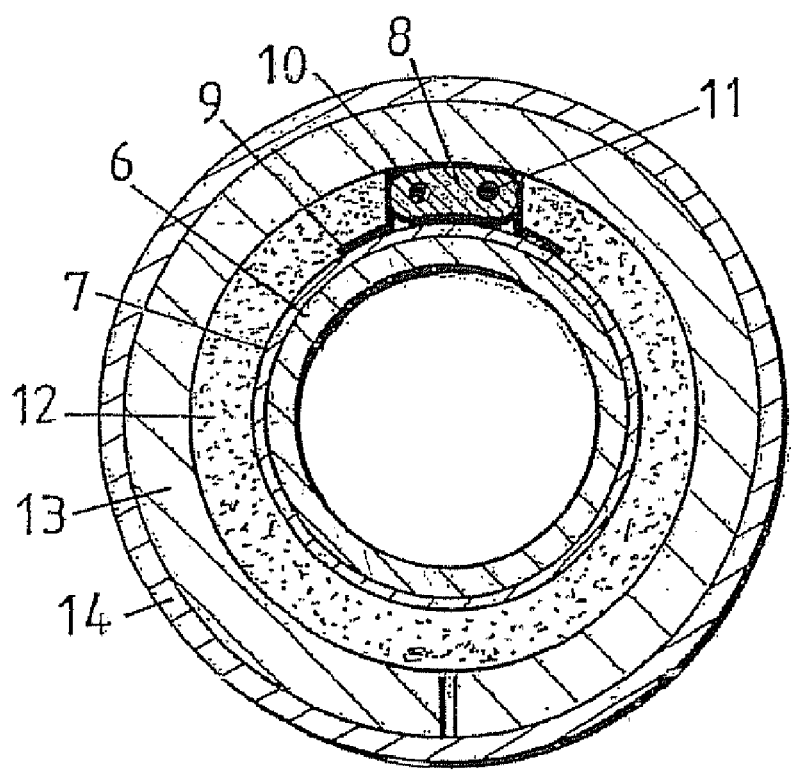
Figure 3:
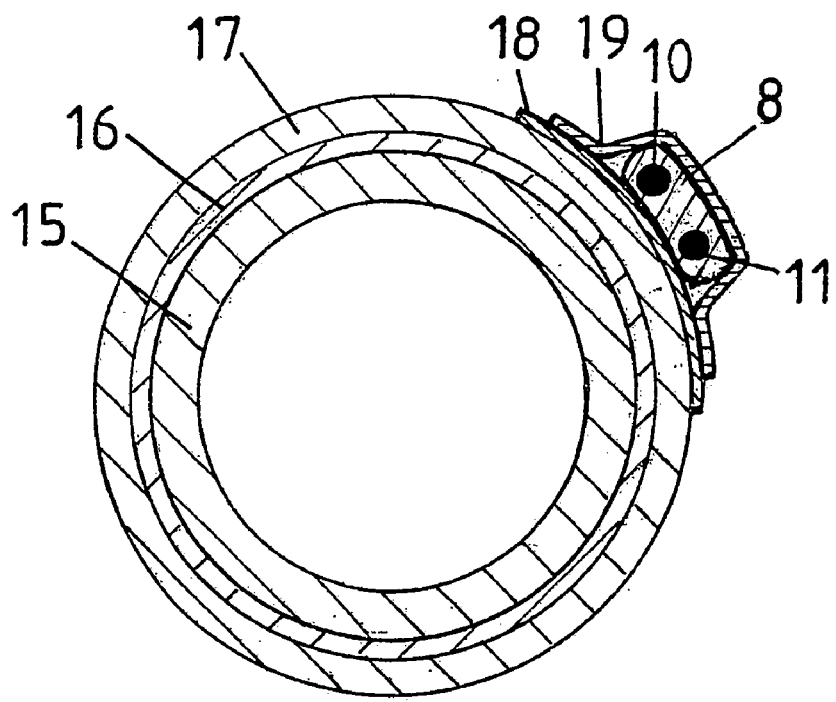
Figure 4:
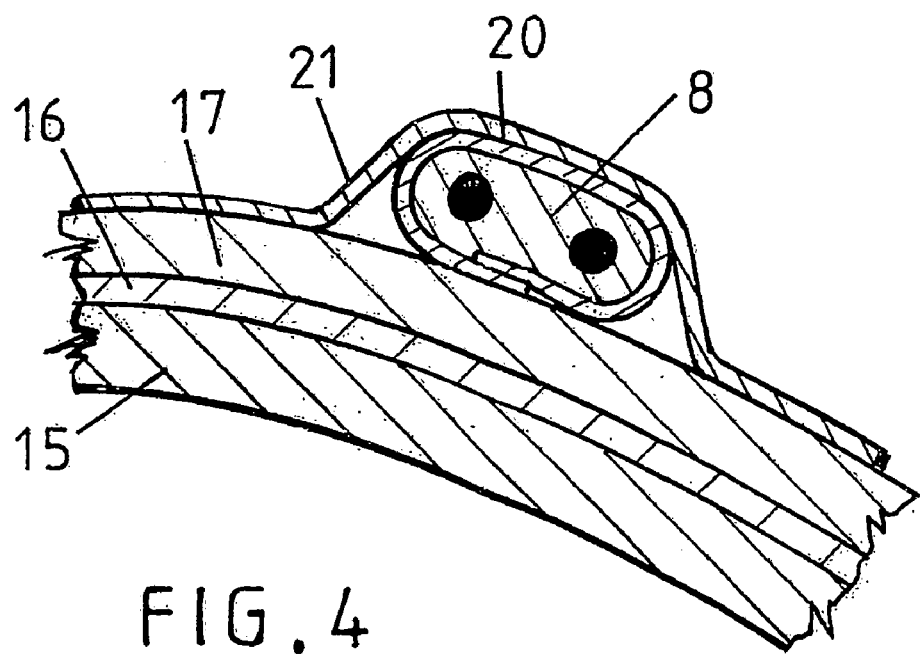
Figure 5:
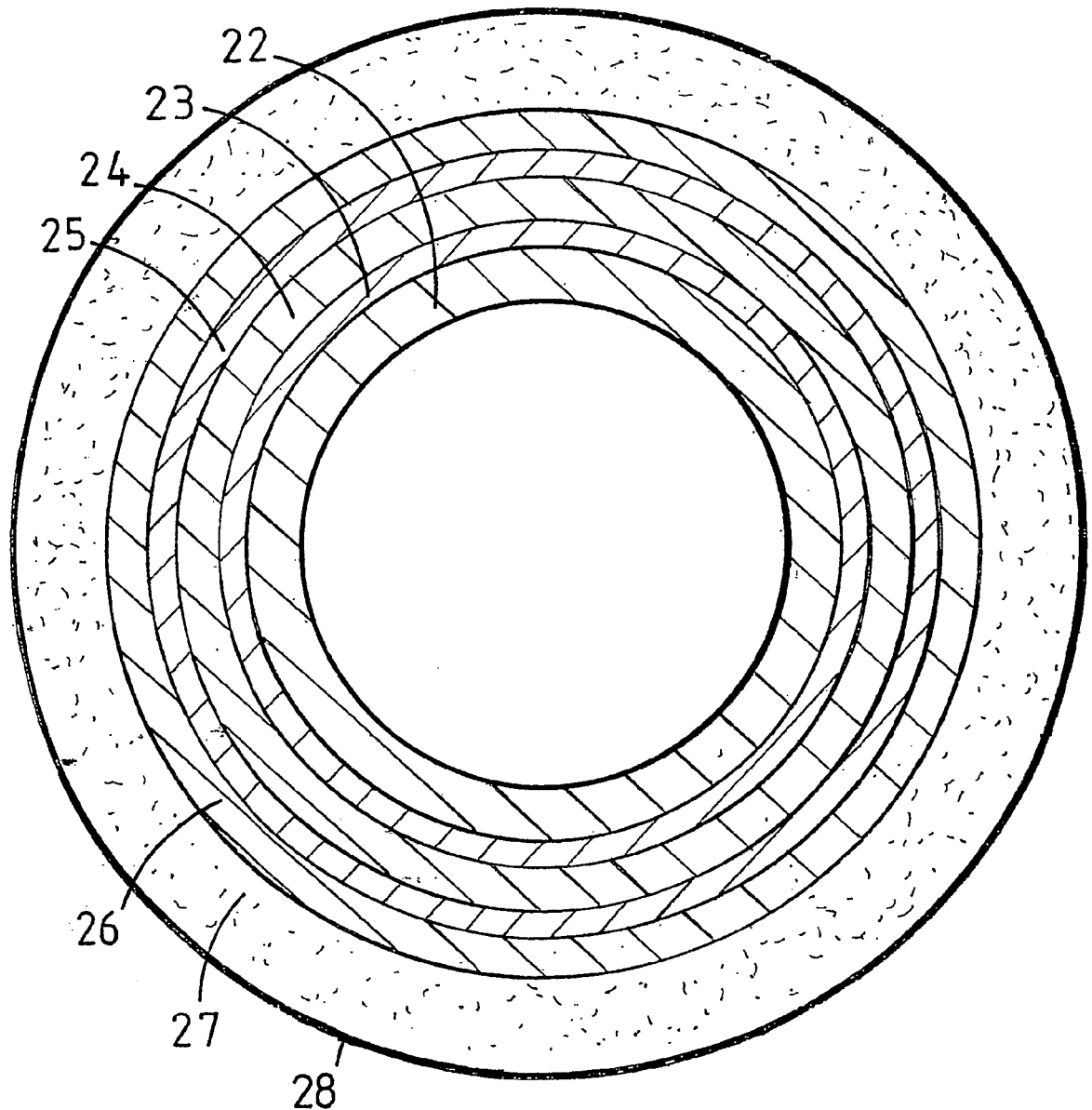

Embodiments of the present invention will now be described, by way of example, with reference to the accompanying drawings, in which:

FIG. 1 schematically represents the cross section of a known conduit incorporating a heater;

FIG. 2 schematically represents a cross section of a first embodiment of the present invention;

FIG. 3 schematically represents the cross section of a second embodiment of the present invention from which thermal insulation and a cover sheath have been removed;

FIG. 4 schematically represents an alternative heater cable support arrangement to that shown in FIG. 3; and FIG. 5 schematically represents the cross section of a third embodiment of the present invention.

Referring to FIG. 1, in the known conduit incorporating a heater a pipe 1 of for example copper is intended to carry a fluid to be heated by a heating cable 2. The heating cable 2 is secured on the pipe by a wrapping film 3. The wrapping film 3 is in turn covered with a fibre glass tape wrapping layer 4 which itself is encased in a polymeric sheath 5. The heating cable 2 comprises two longitudinally extending wires embedded in a body of material having a positive temperature coefficient (PTC). The cable also comprises a covering sheath. The two wires of the cable are connected to opposite poles of a power supply and current passes through the PTC material, thereby heating the cable. Heat generated in the cable is transferred into the copper pipe 1, the material from which the pipe is fabricated ensuring the efficient transfer of energy from the cable 2 to the fluid within the pipe.

The known structure illustrated in FIG. 1 has been used in industrial applications but is not suitable for wide spread use in domestic applications. Great care must be taken to ensure that the copper pipe 1 is electrically insulated from the cable in all possible circumstances. Furthermore, the assembly is not circular in cross section because the insulation 4 and sheath 5 bulge outwards above the cable 2. This makes it difficult for the assembly to be distributed on a roll as the non-circular assembly is difficult to neatly roll up on to a drum. A further problem with this known assembly is that voids are defined on either side of the cable 2 between the copper pipe 1 and the wrapping film 3. These voids affect the thermal characteristics of the assembly in an undesirable manner.

Referring to FIG. 2, this illustrates a first embodiment of the present invention. In the assembly of FIG. 2, an inner tube 6 of cross linked polyethylene forms part of a double-wall composite tube the other half of which is defined by an aluminium tube 7. A heating cable 8 is secured to the outside of the aluminium tube 7 by an adhesive foil 9 which extends over the cable 8 and on to the aluminium tube 7 on either side of the cable. The cable 8 comprises two longitudinally extending wires 10 and 11 embedded in a body of PTC material. A first layer of insulation 12 in the form of a split tube of foam is mounted so as to extend around the aluminium tube 7 from one side surface of the cable 8 to the other, the layer of foam 12 having a thickness substantially the same as the thickness of the cable 8 in the radial direction. A second layer of insulation 13 in the form of a split tube of foam is arranged around the foam layer 12 and over the cable 8. Thus substantially no voids are formed in the body of insulation adjacent the cable 8. The insulation assembly is then covered in a polymeric sheath 14.

With the arrangement of FIG. 2, energy is delivered from the cable 8 to the adjacent aluminium tube 7 in an efficient manner and is conducted by the aluminium tube 7 in the circumferential direction away from the cable. That energy is then coupled through the plastics tube 6 to the fluid within the plastics tube 6. Thus, despite the fact that the double walled composite structure incorporates a layer of plastics material which is not a good thermal conductor, heat can flow from the cable 8 to the content of the assembly in an efficient manner. Thus it is not necessary for the cable 8 to operate at very high temperatures to deliver energy to the content of the assembly.

Referring now to FIG. 3, this illustrates an alternative multi-wall composite tube structure to that shown in FIG. 2. The structure shown in FIG. 3 will be enclosed in a double-layer foam insulating jacket enclosed within a polymer sheath just as in the case of the structure of FIG. 2, but the insulating jacket and sheath are not shown in FIG. 3.

Referring in detail to FIG. 3, in this case the heating cable 8 is mounted on a three-wall composite structure comprising an inner plastics tube 15 of cross link polyethylene, an intermediate aluminium tube 16, and an outer plastics tube 17 of cross linked polyethylene. A metallic foil 18 is adhered to the plastics tube 17 so as to extend beneath the cable 8. A further metallic foil 19 extends over the cable 8 and is adhered to the foil 18. As a result the cable 8 is housed within a metallic jacket defined by the foils 18 and 19. Such a structure enhances the flow of thermal energy from the cable to the plastics tube 17, considerably increasing the heated area of the outer surface of the plastics tube and improving the flow of energy to that surface from portions of the cable 8 which are not in direct contact with the foil 18.

Energy flows from the cable 8 through the foils 18 and 19 to the surface of the tube 17. That energy then flows through the tube 17 and is further distributed in the circumferential direction by the aluminium tube 16. The overall efficiency with which thermal energy is delivered to the content of the inner tube 15 is thus sufficient to be able to use a cable 8 which operates at a relatively low excess temperature as compared with the desired temperature of the interior of the inner tube 15.

FIG. 4 shows an alternative foil arrangement to that shown in FIG. 3. In the case of FIG. 4 the cable 8 is wrapped in a foil 20 before being secured in position on the outer surface of the plastics tube 17 by a further foil 21. The two foils 20 and 21 ensure efficient transfer of thermal energy to the outer plastics tube 17.

In the embodiment of FIG. 2, the fluid-carrying tubes and heating cable 8 are insulated by a two-part foam insulator defined by an inner foam tube 12 and an outer foam tube 13. Such a double-walled insulation assembly could be replaced by a single foam tube the inner surface of which is cut back so as to define an inwardly facing void shaped to receive the cable 8. For example, the tube could be manufactured with an internal diameter slightly larger than the external diameter of the aluminium tube 7 and define abutting edges one or both of which are cut back to provide the necessary void shaped to receive the projecting cable 8. With either single or double layer foam insulators, preformed foam tubes can be prepared and delivered in rolled form for positioning on the multi-wall tube and heater assembly during the manufacturing process. Relative thermal expansion and contraction of the multi-walled tube assembly during use can be readily accommodated by relative movement between the multi-walled tube assembly and the foam insulation.

With a conduit such as described in FIGS. 2 to 4, termination is a relatively simple matter. The conduit could be delivered on a roll and dispensed by the installer so as to extend between for example a source of domestic hot water and a room in which say two taps are provided to dispense that water. The supply conduit could have the outer sheath and insulation stripped back so as to expose the cable and the end of the multi-walled tube structure. Appropriate connections could then be made to further conduits of the same type extending to the taps, and appropriate connections could also be made to the heating cables. For example, an incoming domestic water supply conduit could be connected to a manifold with conduits extending from the manifold to each tap. The manifold could incorporate a simple electrical connector assembly to which cables mounted on the incoming and outgoing conduits could be easily connected.

Referring to FIG. 5, an alternative conduit in accordance with the present invention is illustrated which comprises an inner plastics tube 22 of for example cross linked polyethylene, an aluminium tube 23, a layer 24 of a material with a positive temperature coefficient, a further aluminium tube 25, and an outer plastics tube 26 of for example cross-linked polyethylene. The outer plastics layer may be covered in an insulating layer 27 which in turn is housed within a polymer sheet 28. In this multi-walled composite structure, the heater is defined by the aluminium tubes 23 and 25 and the PTC material layer 24 sandwiched therebetween. The tubes 23 and 25 are connected to opposite poles of a power supply such that current flows between them through the PTC material layer 24. Thermal energy is coupled in a highly efficient manner through the aluminium tube 23 and the plastics tube 22 to the content of the overall assembly.

Termination of a conduit such as that described in FIG. 5 will require separate connections to be made to the aluminium tubes 23 and 25. To facilitate such connections, it will be desirable to make the tube 25 in a manner which facilitates easy stripping back of that layer from the end of the assembly. Fluid connection could then be made to the double-walled structure defined by the inner plastics layer 22 and the inner aluminium tube 23. The inner aluminium tube 23 could be connected so as to define an earthed return of the electrical power supply system.

The invention claimed is:

1. A conduit comprising:
   a pipe;
   an electrical heater extending along the length of the pipe;
   a thermally insulating jacket extending around the pipe and heater;
   wherein the pipe comprises a plastics inner tube, the plastics inner tube being received within a deformable metal tube such that the plastics inner tube and deformable metal tube form a composite double-walled structure;
   wherein the heater is in the form of a cable incorporating longitudinally extending wires between which a heating element is electrically connected, the cable being mounted on the pipe; and
   wherein the insulating jacket comprises first and second preformed layers mounted on the pipe, the first layer extending around the pipe from side surfaces of the cable and having a thickness substantially the same as the thickness of the cable measured from a lower surface of the cable in contact with the pipe, and the second layer extending over the first layer and an upper surface of the cable remote from the pipe.

2. A conduit according to claim 1, wherein the insulation comprises a single preformed layer mounted on the pipe, the preformed layer being split longitudinally to define abutting edges which are stepped to accommodate the cable in the space formed between the abutting edges.

3. A conduit according to claim 1, wherein the pipe comprises the plastics inner tube, the metal tube, and an outer plastics tube, the metal tube being sandwiched between the inner and outer plastics tubes, and the heater being in contact with the outer plastics tube.

4. A conduit according to claim 1, wherein the heating element is in the form of a body of material having a positive temperature coefficient and wires extending longitudinally therethrough, the wires being embedded in the body of material.

5. A conduit according to claim 1, wherein the heater is in contact with at least one metal foil adhered to the pipe.

6. A conduit according to claim 5, comprising a metal foil which extends between the heater and the pipe.

7. A conduit according to claim 6, comprising a metal foil which extends over the heater and on to the pipe on either side of the heater.

8. A conduit according to claim 1 comprising a metal foil which is wrapped around the cable.

9. A conduit according to claim 1, wherein the or each plastics tube is formed from cross-linked polyethylene.

10. A conduit according to claim 1, wherein the or each metal tube is formed from aluminium.

11. A conduit according to claim 1, wherein the insulating jacket is formed from one or more preformed tubes of foam.

12. A conduit according to claim 1, wherein the pipe is formed from materials such that if bent it retains the shape into which it is bent.

13. A conduit comprising;
   a pipe;
   an electrical heater extending along the length of the pipe;
   a thermally insulating jacket extending around the pipe and heater;
   wherein the pipe comprises a plastics inner tube, the plastics inner tube being received within a deformable metal tube such that the plastics inner tube and deformable metal tube form a composite double-walled structure; and
   wherein the heater comprises a tube of material having a positive temperature coefficient supported on the pipe between two metal tubes.

14. A conduit according to claim 13, wherein one of the said tubes of electrically conductive material is defined by the said deformable metal tube in which the plastics inner tube is received.

15. A conduit according to claim 13, wherein the pipe comprises the plastics inner tube, the metal tube, and an outer plastics tube, the metal tube being sandwiched between the inner and outer plastics tubes, and the heater being in contact with the outer plastics tube.

16. A conduit according to claim 13, wherein the heater is in contact with at least one metal foil adhered to the pipe.

17. A conduit according to claim 16, comprising a metal foil which extends between the heater and the pipe.

18. A conduit according to claim 17, comprising a metal foil which extends over the heater and on to the pipe on either side of the heater.

19. A conduit according to claim 13, wherein the or each plastics tube is formed from cross-linked polyethylene.

20. A conduit according to claim 13, wherein the or each metal tube is formed from aluminium.

21. A conduit according to claim 13, wherein the insulating jacket is formed from one or more preformed tubes of foam.

22. A conduit according to claim 13, wherein the pipe is formed from materials such that if bent it retains the shape into which it is bent.

23. A heated conduit comprising:
a pipe comprising:
  a polymeric inner tube;
  a deformable metal tube; and
  an outer polymeric tube, the metal tube being sandwiched between the inner and outer polymeric tubes and the polymeric inner tube being received within said deformable metal tube such that the polymeric inner tube and deformable metal tube form a composite double-walled structure;
an electrical heater extending along the length of the pipe and in contact with the outer polymeric tube; and
a thermally insulating jacket extending around the pipe and heater, said insulating jacket comprising first and second preformed layers mounted on the pipe, the first layer extending around the pipe from side surfaces of the heater and having a thickness substantially the same as the thickness of the heater, and the second layer extending over the first layer and a radially outer surface of the heater.

24. A conduit according to claim 23, wherein the heater is in the form of a cable incorporating longitudinally extending wires between which a heating element is electrically connected, the cable being mounted on the pipe.

25. A conduit according to claim 23, wherein the heater includes a heating element in the form of a body of material having a positive temperature coefficient and wires extending longitudinally therethrough, the wires being embedded in the body of material.

26. A conduit according to claim 23, wherein the heater is in contact with at least one metal foil adhered to the pipe.

27. A conduit according to claim 26, comprising a metal foil which extends between the heater and the pipe.

28. A conduit according to claim 27, comprising a metal foil which extends over the heater and on to the pipe on either side of the heater.

29. A conduit according to claim 26 comprising a metal foil which is wrapped around the cable.

30. A conduit according to claim 23, wherein the or each polymeric tube is formed from cross-linked polyethylene.

31. A conduit according to claim 23, wherein the or each metal tube is formed from aluminum.

32. A conduit according to claim 23, wherein the insulating jacket is formed from foam.

33. A conduit according to claim 23, wherein the pipe is formed from materials such that if bent it retains the shape into which it is bent.

* * * * *